United States Patent
Whitens et al.

(10) Patent No.: US 9,663,058 B1
(45) Date of Patent: May 30, 2017

(54) DEPLOYABLE PLASTIC KNEE BOLSTER WITH OFF-CENTERED TELESCOPING SUPPORT CHAMBER

(71) Applicant: Ford Global Technologies, LLC, Dearborn, MI (US)

(72) Inventors: Mike James Whitens, Milford, MI (US); Dean M. Jaradi, Macomb, MI (US); Mohammed Omar Faruque, Ann Arbor, MI (US); S. M. Iskander Farooq, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/007,530

(22) Filed: Jan. 27, 2016

(51) Int. Cl.
*B60R 21/206* (2011.01)
*B60R 21/231* (2011.01)

(52) U.S. Cl.
CPC .......... *B60R 21/231* (2013.01); *B60R 21/206* (2013.01); *B60R 2021/23169* (2013.01)

(58) Field of Classification Search
CPC ................ B60R 21/206; B60R 21/231; B60R 2021/23169
See application file for complete search history.

(56) References Cited

U.S. PATENT DOCUMENTS

| | | | |
|---|---|---|---|
| 3,979,139 A | 9/1976 | Hoffmann et al. | |
| 5,816,613 A | 10/1998 | Specht et al. | |
| 6,145,880 A | 11/2000 | White et al. | |
| 6,213,497 B1 * | 4/2001 | Spencer | B60R 21/045 280/730.1 |
| 6,609,727 B2 | 8/2003 | Figlioli et al. | |
| 7,661,700 B2 | 2/2010 | Imamura et al. | |
| 8,544,876 B2 * | 10/2013 | Best | B60R 21/02 280/730.1 |
| 8,579,325 B2 * | 11/2013 | Roychoudhury | B60R 21/02 280/752 |
| 9,457,760 B1 * | 10/2016 | Raines | B60R 21/239 |
| 2004/0145163 A1 * | 7/2004 | Galmiche | B60R 21/215 280/730.1 |

FOREIGN PATENT DOCUMENTS

| | | |
|---|---|---|
| DE | 10311006 A1 | 9/2004 |
| JP | 5212555 B2 | 6/2013 |

* cited by examiner

*Primary Examiner* — Faye M Fleming
(74) *Attorney, Agent, or Firm* — Frank A. MacKenzie; Bejin Bieneman PLC

(57) ABSTRACT

An active knee bolster for disposition in a motor vehicle dashboard includes a main bladder and a side bladder. The main bladder is formed of molded plastic and has an aperture therein at a first end. The main bladder also has a substantially flat undeployed shape and a deployed shape extending away from the dashboard. The side bladder is formed of molded plastic and has an open side. The open side is disposed over the aperture in the main bolster front panel and is sealingly connected to the main bladder. The side bladder has a substantially flat undeployed shape substantially flush with the undeployed shape of the main bolster. The side bladder has a deployed shape extending away from the main bladder.

16 Claims, 5 Drawing Sheets

DEPLOYABLE PLASTIC KNEE BOLSTER WITH OFF-CENTERED TELESCOPING SUPPORT CHAMBER

BACKGROUND

Commercially available vehicles are provided with passive knee bolsters to mitigate occupant knee injury risk in various frontal impact modes such as a high speed full frontal impact. Relatively recently, automakers have introduced knee airbags to further improve occupant protection performances. However, more recently introduced small overlap frontal tests and oblique pole tests tend to induce movement of at least an outboard occupant leg, particularly the associated knee, laterally away from the knee airbag, putting it into position to make contact with the door or the A-pillar, alternatively characterized as a hinge pillar, and thereby increasing the risk of injuries to the knee. Knee airbags fail to completely protect the knee in such instances. Even enlarged knee airbags with side extensions do not completely prevent knee injuries, as airbags' constituent fabric material is prone to lateral deflection, failing to completely prevent the prevent knees from deviating from a preferred straight-ahead position, and from making contact with the door and the A-pillar.

DETAILED DESCRIPTION

A disclosed active plastic knee bolster incorporates a supplemental side bolster. The side bolster beneficially blocks an occupant's outboard knee from lateral displacement and from injuries that might otherwise occur due to such lateral displacement in oblique and offset crashes.

Relative orientations and directions (by way of example, upper, lower, bottom, rearward, front, rear, back, outboard, inboard, inward, outward, lateral, let, right) are set forth in this description not as limitations, but for the convenience of the reader in picturing at least one embodiment of the structures described. Such exemplary orientations are from the perspective of an occupant seated in a driver seat, facing a dashboard.

Figure 1:
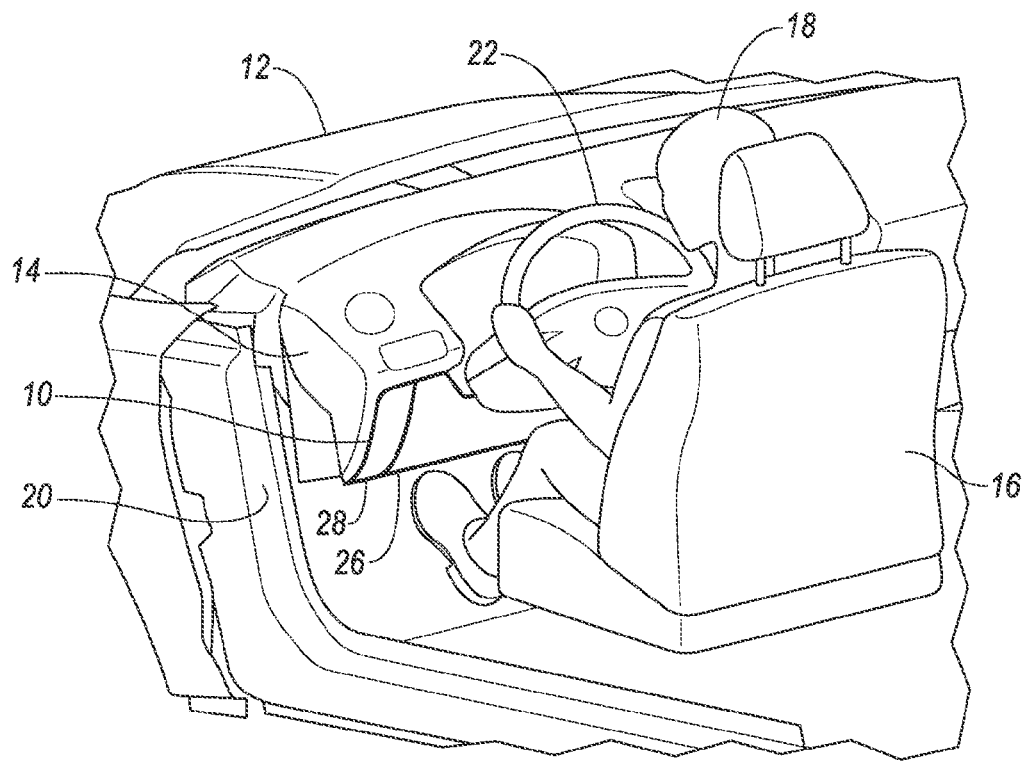
FIG. 1 is a perspective view of a vehicle having an exemplary knee bolster integrated into a vehicle dashboard.

FIG. 1 illustrates an exemplary active knee bolster 10 installed in a vehicle 12, and more particularly in a vehicle dashboard 14. Bolster 10 is in an undeployed condition in FIG. 1, and is located in front of and in alignment with a front seat 16 which receives an occupant 18. Bolster 10 extends laterally from an outboard side proximate to a vehicle's A-pillar or door hinge pillar 20 to an inboard side proximate to a center console (not shown) of vehicle 12. In the exemplary illustration of FIG. 1, bolster 10 passes under a steering wheel 22. Bolster 10 defines a lower dashboard surface presented to vehicle occupants. A mirror image bolster could be employed on an opposite side of the vehicle, without a steering wheel. While exemplary bolster 10 includes an area of reduced height 24 in an area passing under steering wheel 22, a bolster placed on the side of dashboard 14 without a steering wheel could have a constant height across its entire span between the A-pillar and the center console.

Figure 2:
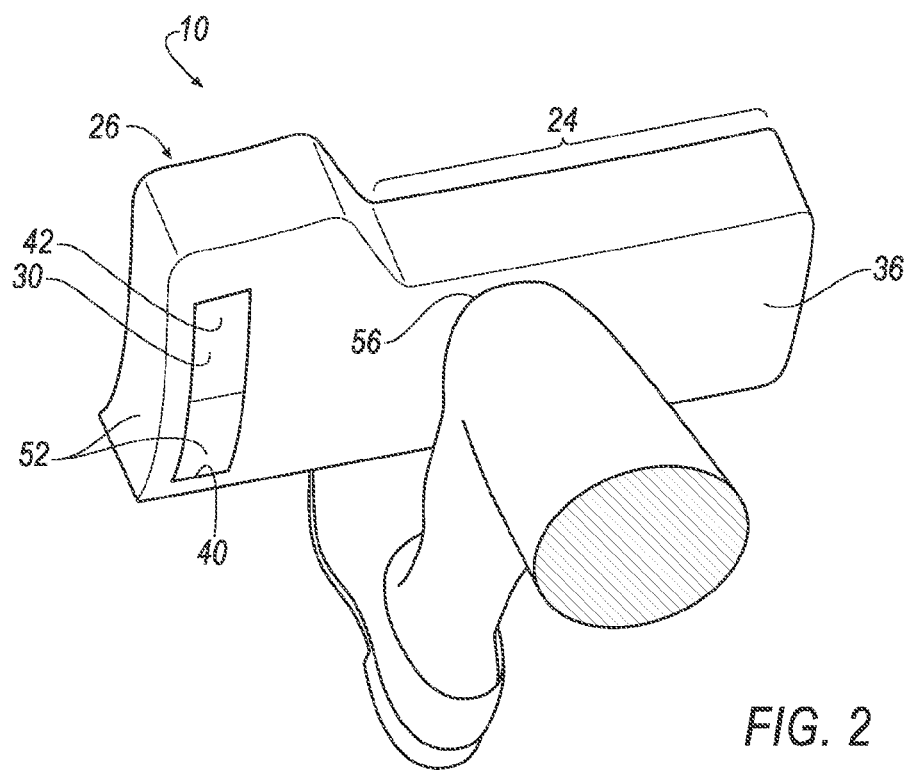
FIG. 2 is a perspective view of the exemplary knee bolster of FIG. 1 in a deployed condition with a side support detached, illustrating a connecting opening for the side support, with an occupant leg disposed behind the knee bolster.
Figure 5:
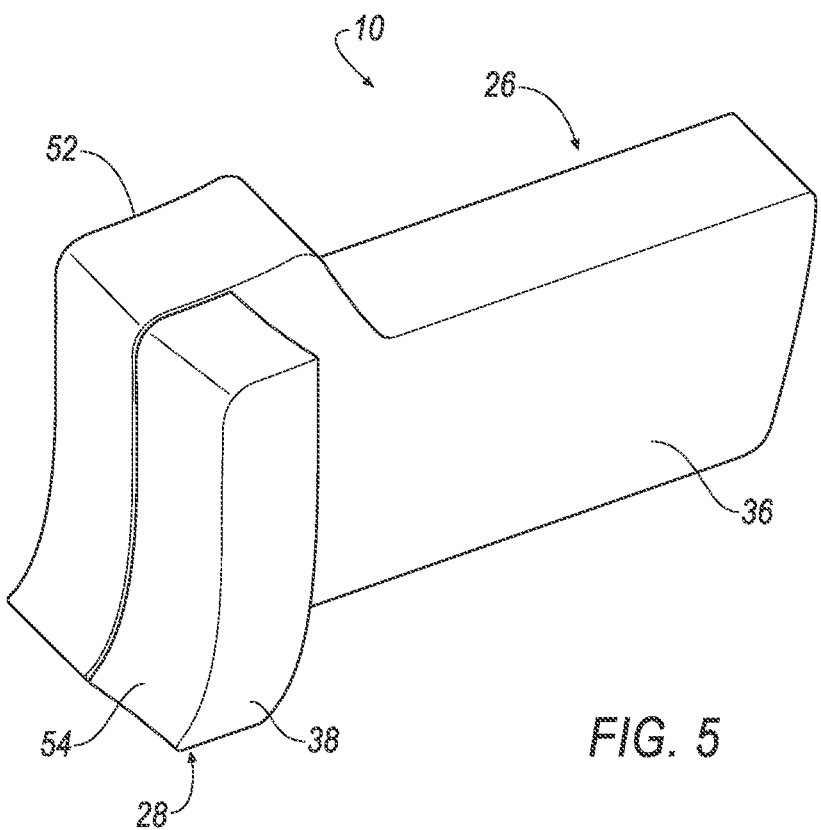
FIG. 5 is a perspective view of the knee bolster of FIG. 1 and FIG. 2 in a deployed condition.
Figure 7:
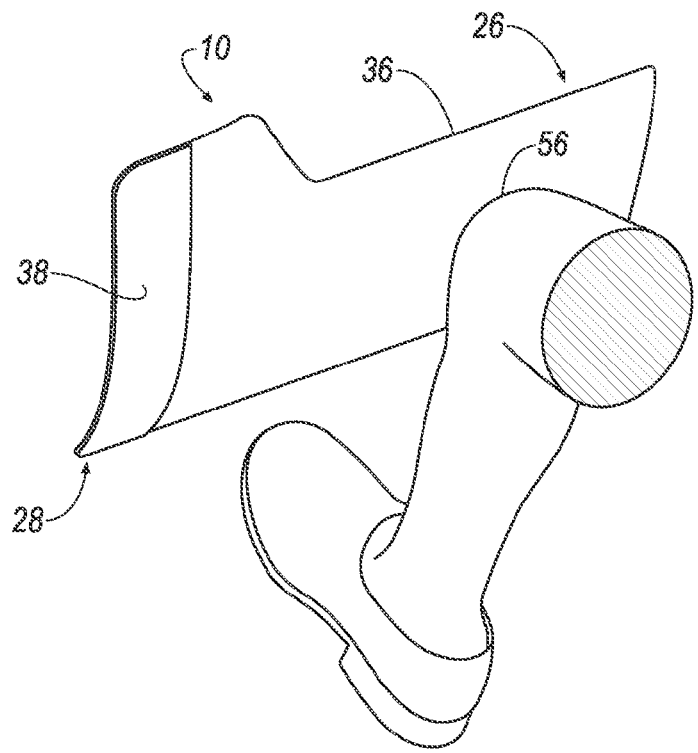
FIG. 7 is a perspective view of the knee bolster of FIG. 1 in an undeployed condition with an occupant leg disposed behind the knee bolster.

As more clearly seen in the exemplary deployed bolster of FIG. 5, bolster 10 includes both an exemplary main bolster 26 and an exemplary side bolster 28. Main bolster 26 has an inner chamber 30 best seen in FIG. 2. Main bolster 26 and side bolster 28 are each formed of molded plastic. Both have a substantially flat shape in an undeployed condition as illustrated in FIG. 7, and increase in thickness in the deployed condition illustrated in FIG. 5.

Figure 3:
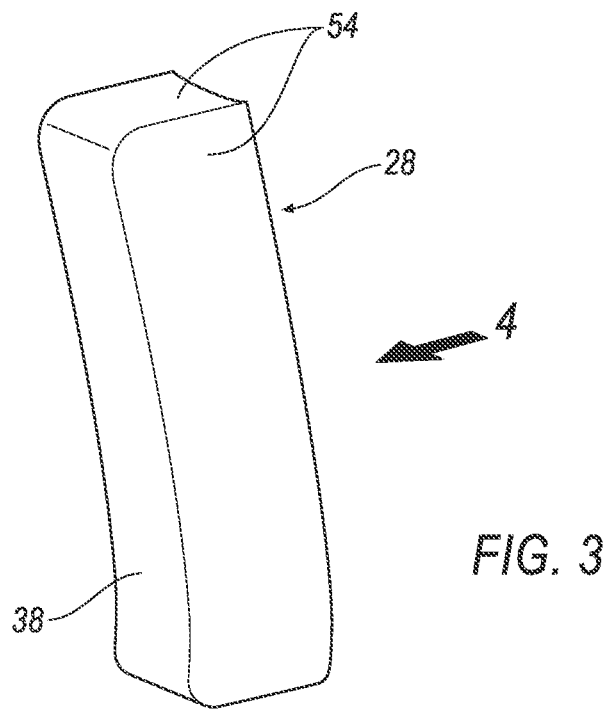
FIG. 3 is a perspective view of the side support in a deployed condition in a first orientation.
Figure 4:
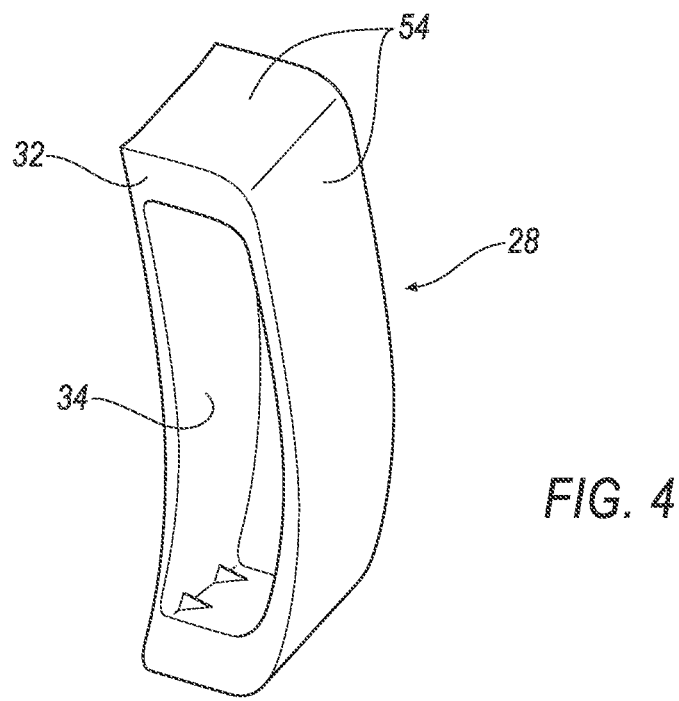
FIG. 4 is a perspective view of the side support in a deployed condition in the direction of arrow 4.

Exemplary side bolster 28, shown separately in its deployed form in FIG. 3 and FIG. 4, is fixed to an outboard portion of main bolster 26, and extends substantially the same height as main bolster 26. Side bolster 28 has an open side 32 shown in FIG. 4, exposing an inner chamber 34 that faces main bolster 26. Main bolster 26 and side bolster 28 each have a respective front panel 36 and 38 facing seat 16 and occupant 18. Each of panels 36 and 38 can be styled to have a Class A surface with grain and color matched to the adjacent instrument panel or dashboard surfaces. A Class A surface provides smooth and continuous transitions of surfaces so that there are no sudden or sharp edges. Panels 36 and 38 are accordingly substantially flush with each other in an undeployed condition. Alternatively, bolster 10 may incorporate discrete trim panels having the desired surface finish and color fixed to front panels 36 and 38.

A connecting opening 40 in front panel 36 aligns with the location of side bolster 28. Opening 40 is of a similar size and shape as open side 32 of side bolster 28, allowing unimpeded communication of any pressurizing gas between main bolster 26 and side bolster 28. Open side 32 covers opening 40. Such unimpeded communication of pressurizing gas enables the use of a single inflation point for bolster 10 through which pressurizing gas can be received to inflate both main bolster 26 and side bolster 28.

Side bolster 28 is sealingly fixed to main bolster front panel 36 by any suitable method, exemplary methods including ultrasonic welding, hot welding and integral forming. For aesthetic purposes, a color-matched seal tape or similar seal can be placed over the resultant seam between side bolster 28 and main bolster 26.

Figure 6:
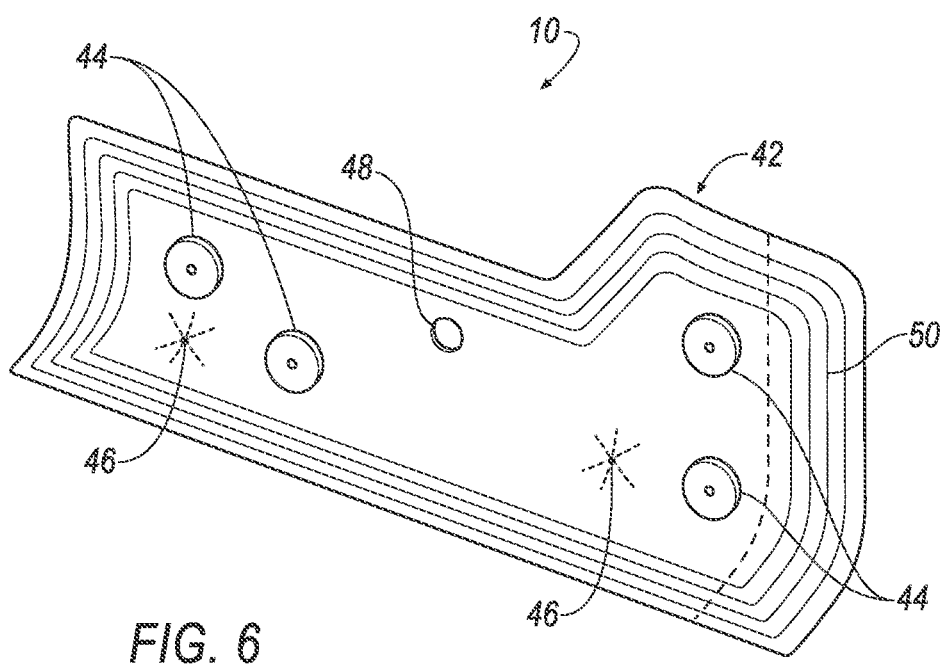
FIG. 6 is a rear perspective view of the knee bolster of FIG. 1 in an undeployed condition.

Bolster 10 may be characterized as being an inflatable bladder, with an inflatable main bladder cooperatively defined by a rear panel 42 and front panel 36 and corresponding to main bolster 26, in combination with an attached side bladder cooperatively defined by front panel 38 and main bolster front panel 36. Rear panel 42, also formed of molded plastic and best seen in FIG. 6, has a plurality of mounting elements 44. Exemplary mounting elements 44 may be bosses, each having an aperture for receiving a threaded fastener. Exemplary vents 46 may be incorporated into rear panel 42. An aperture 48 for receiving a gas inflator nozzle or a fill tube (not shown) may also be located in rear panel 42. A gas inflator can be located in suitably close proximity to knee bolster 10 and joined to it by the fill tube. Rear panel 42 includes an exemplary folding accordion section 50 forming exemplary side walls 52 of main bolster 26. Accordion section means a section or part of bolster 10 formed of a plurality of zig-zag folds similar to the pleats of an accordion bellows. The folds of accordion section 50 extend continuously around main bolster 26. FIG. 6 shows a nested accordion section in which the folds closer to front panel 36 at an outer periphery of rear panel 42 circumscribe folds more remote to front panel 36. The folds could alternatively be stacked over each other, but such an arrangement would result in the undeployed bolster 10 having a significantly greater thickness. The accordion section 50 straightens during deployment, defining an exemplary inflated shape. Side bolster 28 similarly has exemplary side walls 54 formed by an accordion section which straightens when bolster 10 is inflated. The accordion section of side bolster 28 is concealed by rear panel 42. An exemplary embodiment of side bolster 28 also has nested accordion folds. Depending on the design configuration of the folds, and the thickness of fully deployed side bolster 28, it may be desirable to provide a pocket in rear panel 42 to accommodate the accordion folds of side bolster 28. A peripheral seam between rear panel 42 and front panel 36 is formed by hot welding, for example. However, ultrasonic welding or other suitable bonding or joining methods may be employed.

Figure 8:
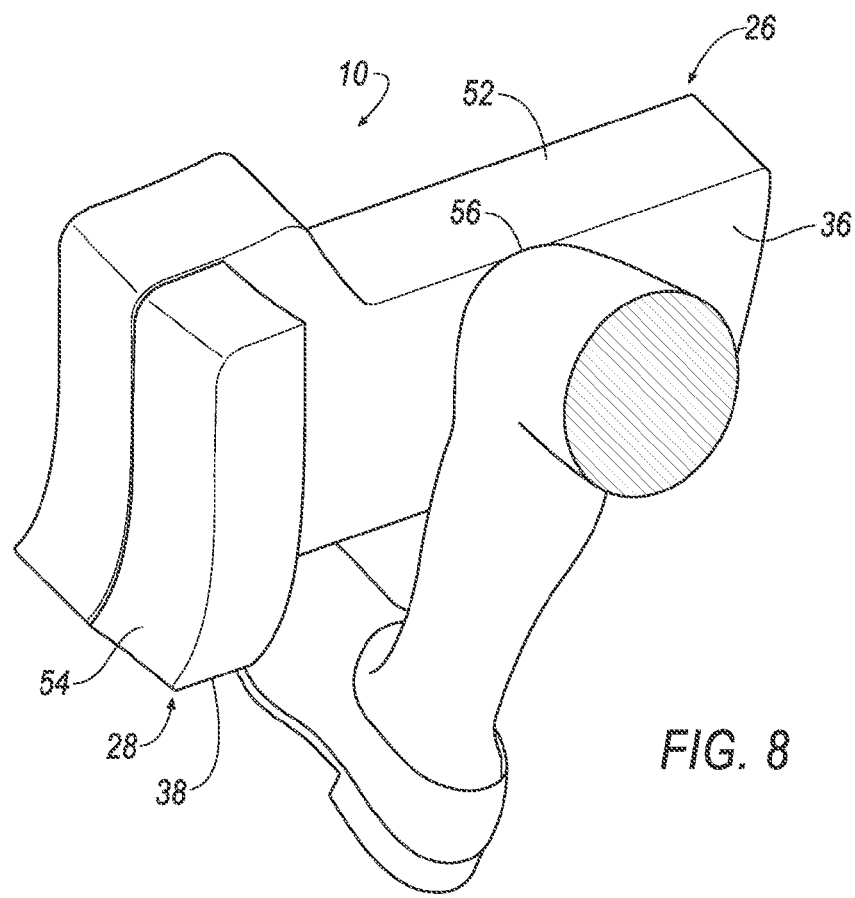
FIG. 8 is a perspective view of the knee bolster of FIG. 7 in an inflated condition with an integrated side support and with an occupant leg disposed behind the knee bolster.
Figure 9:
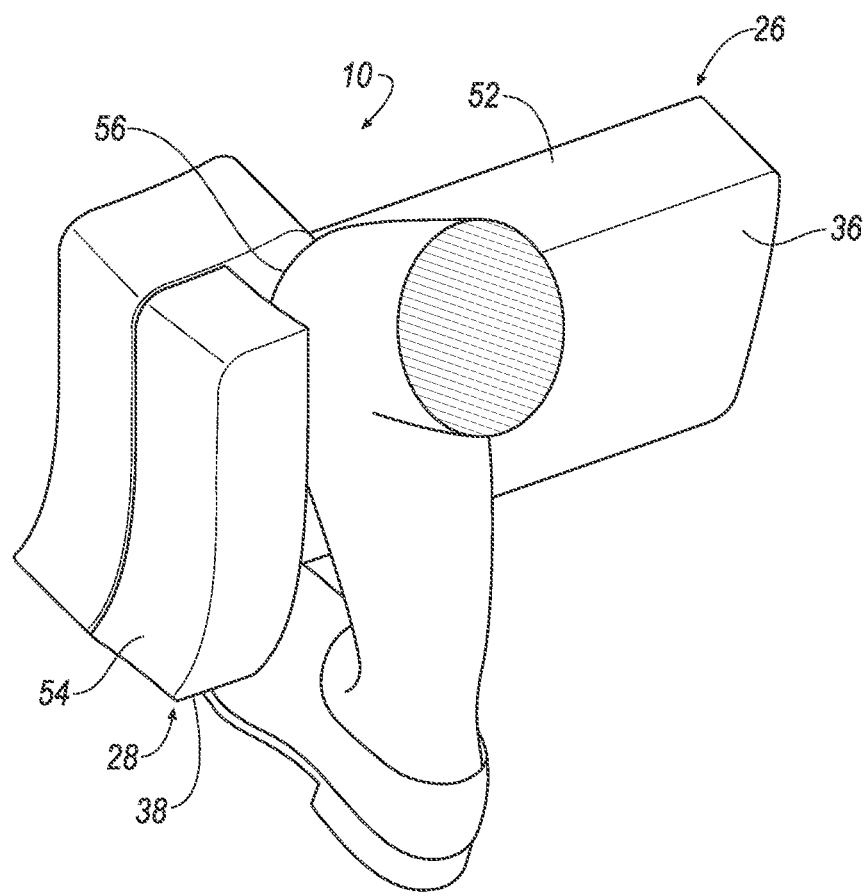
FIG. 9 is a perspective view of the knee bolster of FIG. 8 with an occupant knee in engagement with the side bolster.

In operation during a conventional direct frontal impact event, active bolster 10 is expanded from an undeployed shape (FIG. 7) to a deployed shape (FIG. 8) upon the sensing of an impact event. Deployment occurs with the release of pressurized gas into exemplary bolster 10 through aperture 48. The folding accordion section 50 straightens to form side walls 52 of main bolster 26. The folding accordion section of side bolster 28 likewise straightens to form side walls 54. The frontal impact results in a sudden deceleration of vehicle 12. Occupant 18 will, due to his/her inertia, continue moving forward, even though restrained by active and passive restraints such as air bags and seat belts. With such forward movement, occupant knees 56 impact bolster 10, with loading against bolster 10 being cushioned by gas escaping through vents 46. When occupant knee 56 is not in a straight-ahead, it can slide in an outboard direction after coming into contact with main bolster 26. Side bolster 28, as shown in FIG. 9, engages knee 56, blocking knee 56 from further lateral movement and preventing outboard knee 56 from impacting hinge pillar 20 and the door. The venting dissipates the impact energy of the occupant knees against front panel 36 in a controlled manner. The controlled deflation of bolster 10 cushions occupant knees 56 during the impact event and reduces trauma to occupants and especially occupant knees during an impact.

The same operational sequence occurs when there is a lateral element to the impact event, as with a small overlap frontal impact. In such an impact, vehicle 12 is both decelerated in a forward direction, and is rapidly displaced in a lateral direction, opposite the side of the overlap impact. For example, a small overlap frontal impact occurring in the area of vehicle 12's left hand head lamp will cause a front end of the vehicle to pivot in a rightward direction, while at the same time, significantly decelerating vehicle 12. Upon such deceleration, knee bolster 10 is deployed as described above. However, occupant 18 will tend to move in a straight line, while vehicle 12 is being forced to the right. As a result, outboard occupant knee 56 tends to move toward an uncushioned vehicle door (not shown) and door hinge pillar 20. Side bolster 28, as shown in FIG. 9, engages knee 56, blocking such lateral (relative to the vehicle and the knee bolster) movement, keeping knee 56 aligned with panel 36 for the beneficial cushioning provided by bolster 10. Side bolster 28 thus beneficially protects knees in offset and similarly protects them in oblique impacts, keeping occupant legs in a preferred position by resisting rotation of the leg. Because of its molded plastic structure, side bolster 28 is more rigid and more effective at preventing lateral movement than an extension of fabric airbag located under dashboard 14. Deployed plastic side bolster 28, with its thicker cross section and stiffer material, provides a stiffer obstacle, better able to prevent knee 56 from sliding past knee bolster 10, and to maintain knee 56 in the preferred position for engagement with main bolster 26. FIG. 8 shows the integrated deployable plastic knee bolster 10 with side bolster 28 in the deployed state inside a vehicle. As can clearly be seen in FIG. 8, deployed side support bolster 28 prevents knee 56 from veering away from main bolster 26, protecting occupant knee 56 during frontal crash modes that would otherwise tend to rotate the leg and knee 56 away from the main bolster. The disclosed deployable plastic knee bolster 10 effectively protects occupant knees 56 in a full range of frontal impact modes.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

It is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. Unless otherwise stated or qualified herein, all claim terms are intended to be given their plain and ordinary meanings. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. An active knee bolster for disposition in a motor vehicle dashboard comprising:

a main bladder formed of molded plastic having an aperture therein at a first end and the main bladder having a substantially flat undeployed shape and having a deployed shape extending away from the dashboard; and a side bladder formed of molded plastic and the side bladder having an open side and the open side disposed over the aperture in a main bladder front panel and the side bladder sealingly connected to the main bladder wherein the side bladder has a substantially flat undeployed shape substantially flush with the undeployed shape of main bladder and a deployed shape extending away from the main bladder.

2. The active knee bolster of claim 1, wherein the main bladder includes a first front panel and a rear panel with the aperture in the first front panel, and further wherein the side bladder includes a second front panel, the front panels being substantially flush in an undeployed condition.

3. The active knee bolster of claim 2, wherein a first collapsible side wall formed of molded plastic is disposed between the first front panel and the rear panel.

4. The active knee bolster of claim 3, wherein the first collapsible side wall has an accordion section in the undeployed shape.

5. The active knee bolster of claim 3, wherein the first collapsible side wall is formed integral with the rear panel.

6. The active knee bolster of claim 2, wherein the front panels have a class A surface in the undeployed shape.

7. The active knee bolster of claim 2, wherein a collapsible side wall formed of molded plastic is disposed between the first front panel and the second front panel.

8. The active knee bolster of claim 7, wherein the collapsible side wall has an accordion section in the undeployed shape.

9. The active knee bolster of claim 3, wherein a second collapsible side wall formed of molded plastic is disposed between the first front panel and the second front panel.

10. The active knee bolster of claim 4, wherein a second collapsible side wall formed of molded plastic is disposed between the first front panel and the second front panel and the second collapsible side wall has an accordion section in the undeployed shape.

11. The active knee bolster of claim 2, wherein the front panels have a class A surface in the undeployed shape.

12. An active knee bolster for disposition in a motor vehicle dashboard comprising:

a main bolster having
a main bolster front panel formed of molded plastic that in an installed orientation faces a vehicle seat and has an aperture therethrough at a first end,
a rear panel formed of molded plastic having a mounting element, and a main bolster collapsible side wall formed of molded plastic sealingly connected to and joining the main bolster front panel and the rear panel,
wherein the main bolster has a substantially flat undeployed shape and has a deployed shape extending away from the dashboard and toward the seat; and a side bolster having
a side bolster front panel formed of molded plastic that in an installed orientation faces a vehicle seat, and
a side bolster collapsible side wall formed of molded plastic and defining an open side and the open side disposed over the aperture in the main bolster front panel and the side bolster collapsible side wall sealingly connected to and joining the side bolster front panel and the main bolster front panel,
wherein the side bolster has a substantially flat undeployed shape substantially flush with the undeployed shape of the main bolster and a deployed shape extending away from the main bolster and toward the seat.

13. The active knee bolster of claim 12 wherein the collapsible side walls each have an accordion section in the undeployed shape.

14. The active knee bolster of claim 12, wherein the main bolster collapsible side wall is formed integral with the rear panel.

15. The active knee bolster of claim 12, wherein the front panels have a class A surface in the undeployed shape.

16. The active knee bolster of claim 13, wherein the front panels have a class A surface in the undeployed shape.

* * * * *